Figure 4:
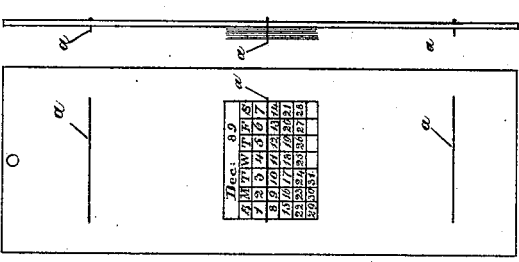
Figure 3:
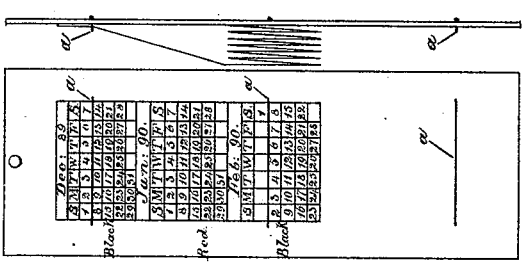
Figure 2:
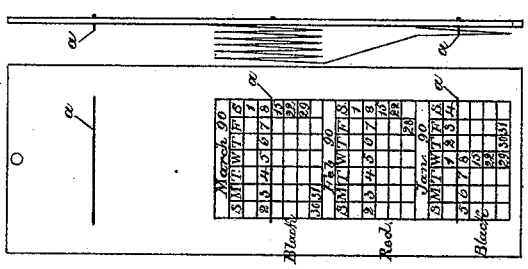

(No Model.)  17 Sheets—Sheet 1.

W. C. HAWKINS.
CALENDAR.

No. 467,118. Patented Jan. 12, 1892.

Witnesses:
Francis P. Reilly.
W. A. Dripps.

Inventor:
W. C. Hawkins
by P. R. Voorhees
Atty.

(No Model.) W. C. HAWKINS. 17 Sheets—Sheet 2.
CALENDAR.

No. 467,118. Patented Jan. 12, 1892.

Witnesses:
Francis P. Reilly.
W. A. Dripps.

Inventor:
W. C. Hawkins
C. R. M. Voorhees
Atty.

(No Model.)
W. C. HAWKINS.
CALENDAR.
No. 467,118. Patented Jan. 12, 1892.
17 Sheets—Sheet 3.
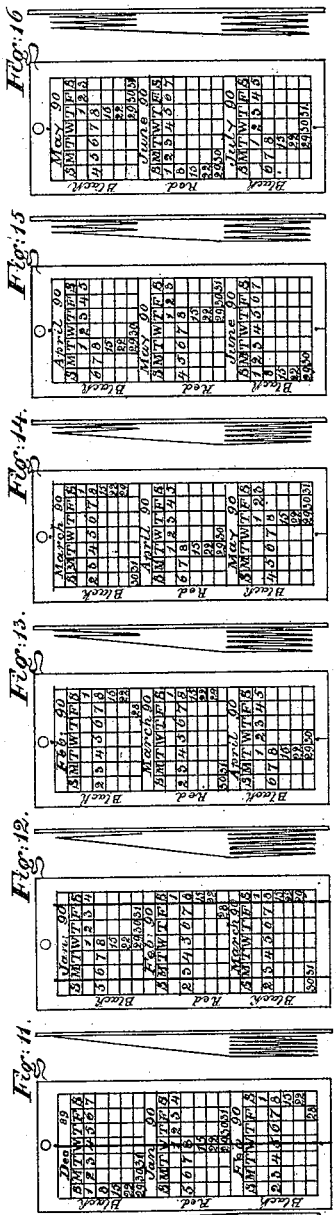
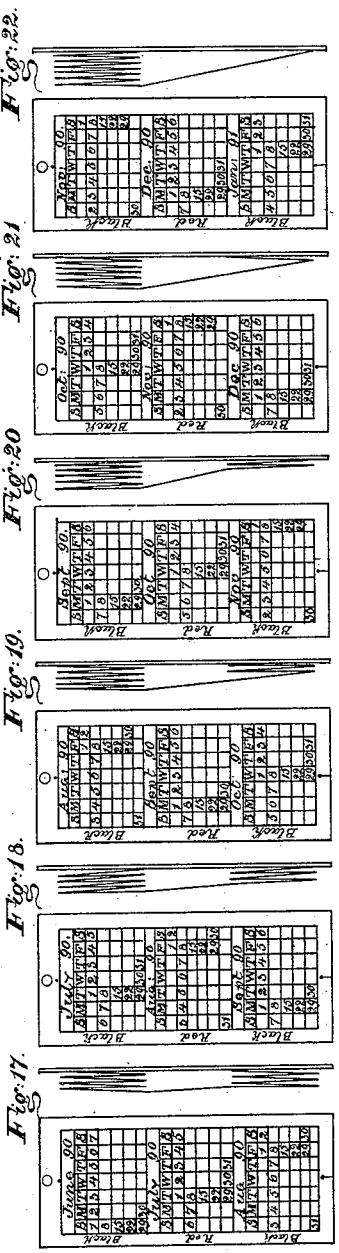
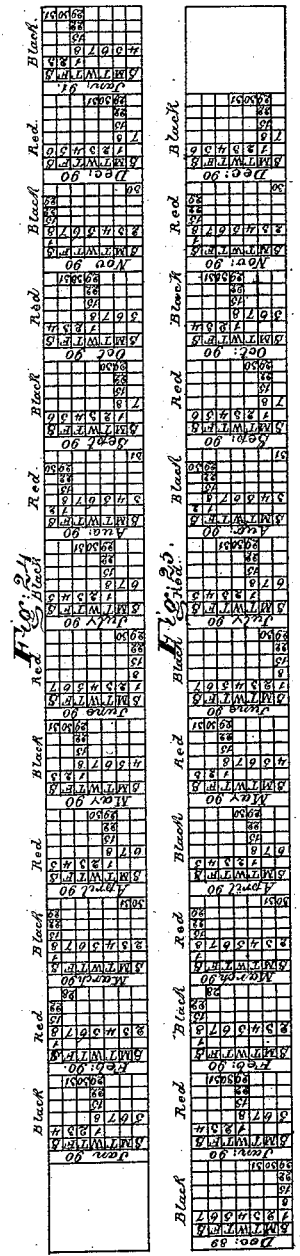
Witnesses.
Francis P. Reilly
W. A. Dripps.
Inventor
W. C. Hawkins
by P. R. Voorhees
Atty.

(No Model.)  W. C. HAWKINS.  17 Sheets—Sheet 4.
CALENDAR.
No. 467,118.  Patented Jan. 12, 1892.
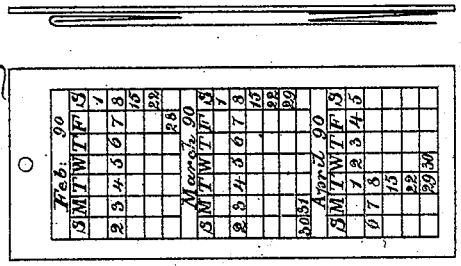
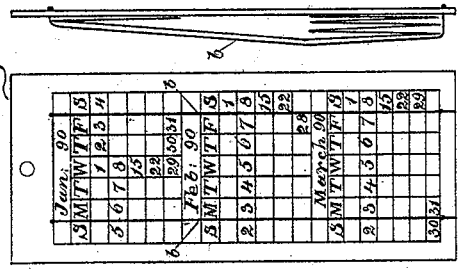
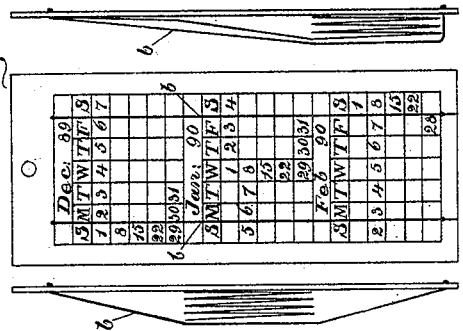
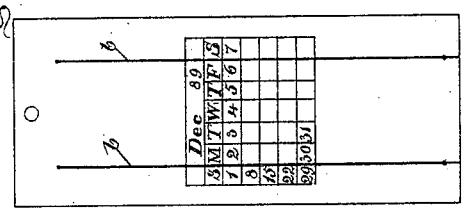
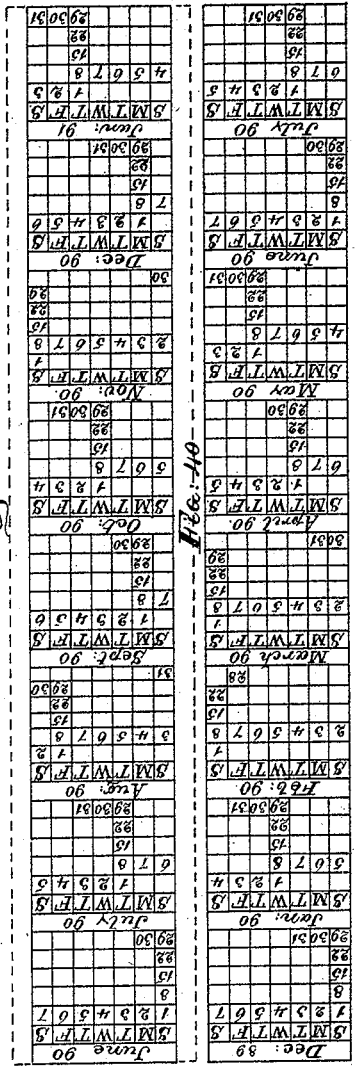
Witnesses:
Francis P. Reilly
W. A. Dipps.
Inventor:
W. C. Hawkins
by P. N. Voorhees
Atty.

(No Model.) 17 Sheets—Sheet 5.
W. C. HAWKINS.
CALENDAR.
No. 467,118. Patented Jan. 12, 1892.
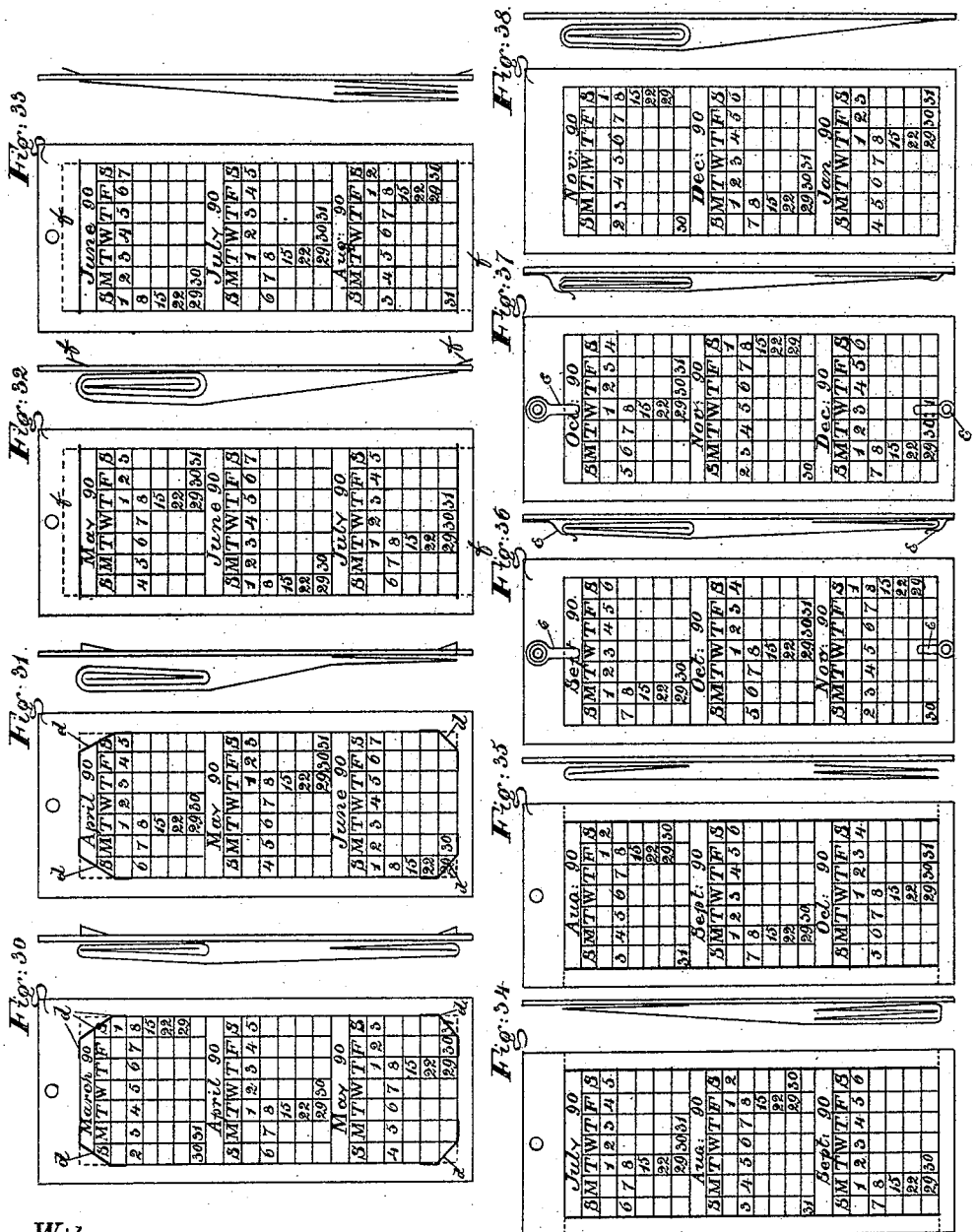
Witnesses:
Francis P. Reilly
W. A. Dripps
Inventor:
W. C. Hawkins
by R. M. Voorhees
Atty.

(No Model.)  17 Sheets—Sheet 6.
W. C. HAWKINS.
CALENDAR.
No. 467,118. Patented Jan. 12, 1892.
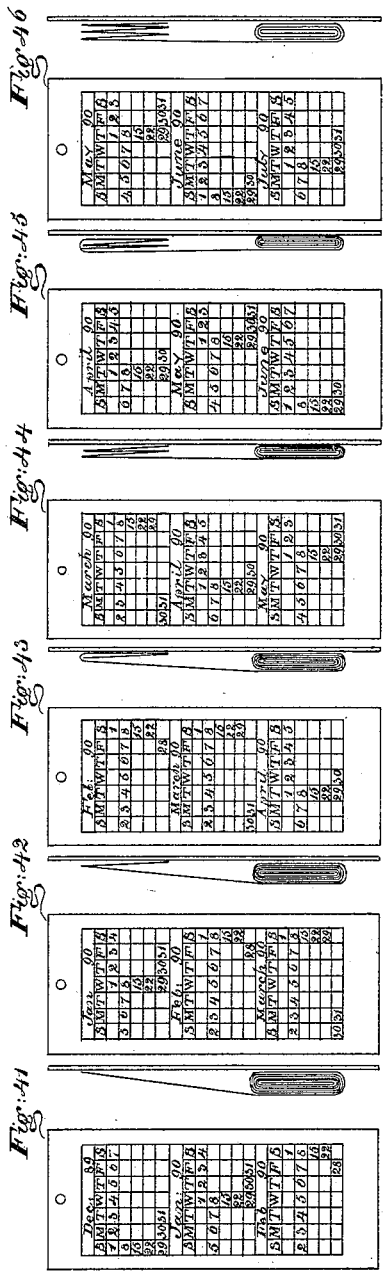
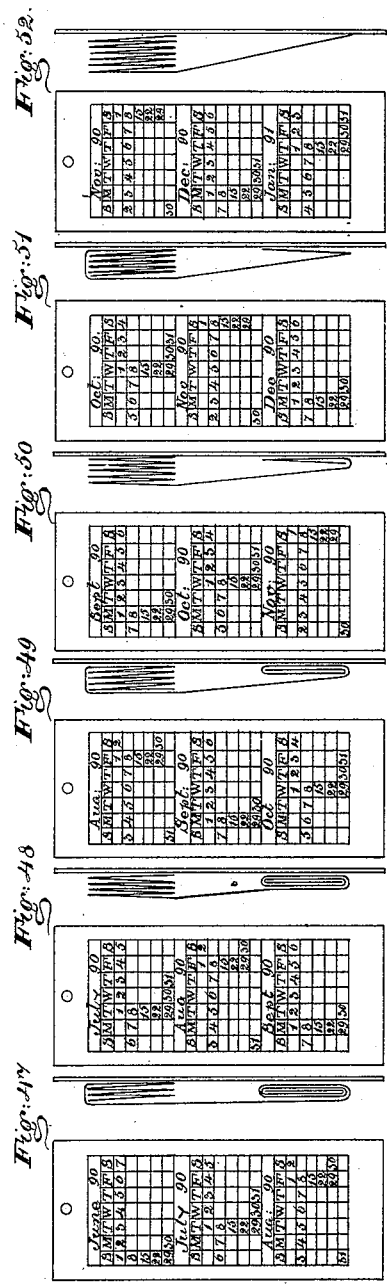
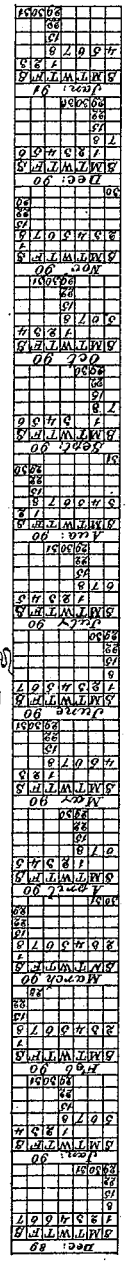
Witnesses:
Francis P. Reilly
W. A. Dripps
Inventor:
W. C. Hawkins
by P. M. Voorhees
Atty.

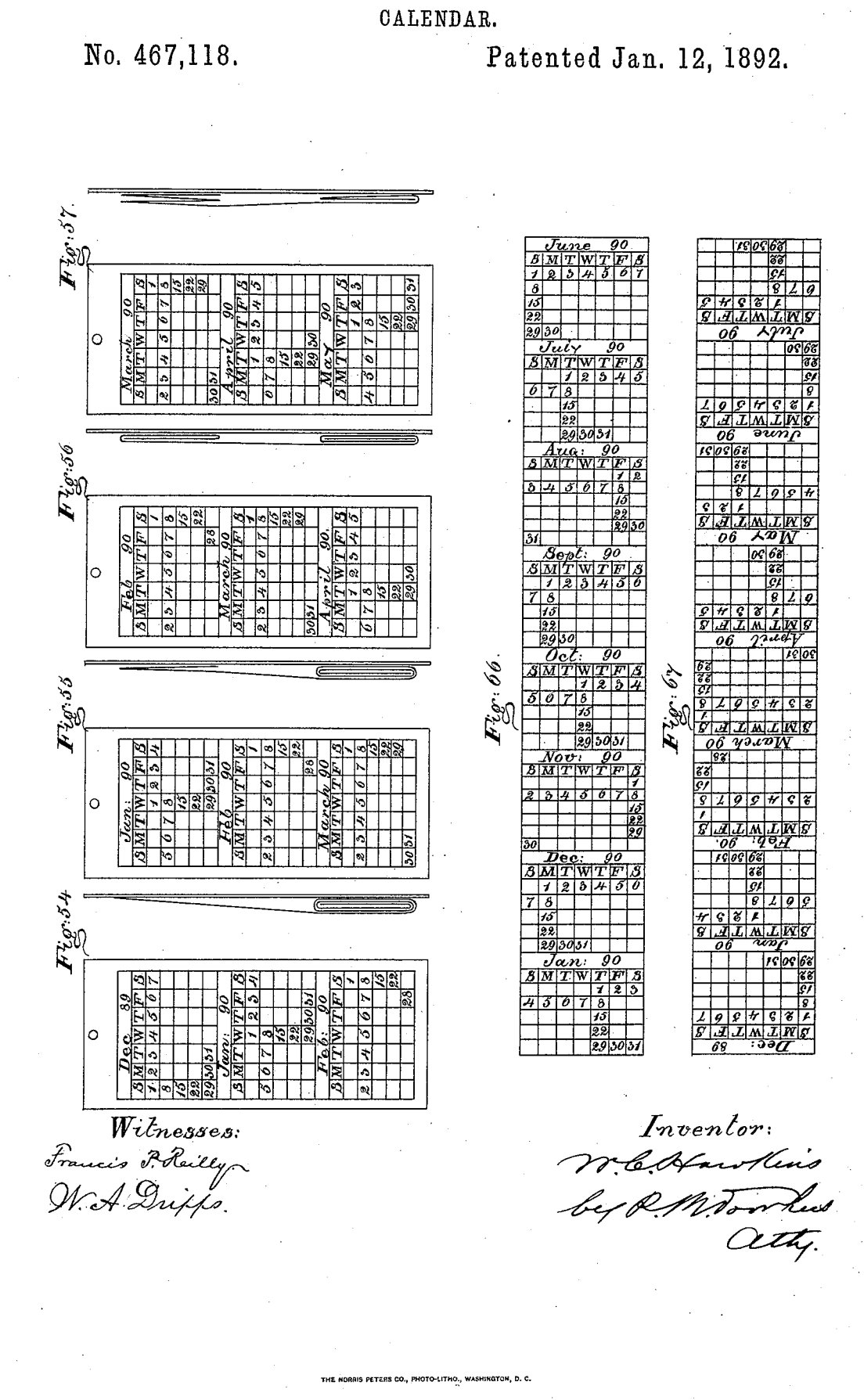

(No Model.)

W. C. HAWKINS.
CALENDAR.

17 Sheets—Sheet 7.

No. 467,118.

Patented Jan. 12, 1892.

Witnesses:
Francis P. Reilly
N. A. Dripps.

Inventor:
W. C. Hawkins
by R. M. Fowler
Atty.

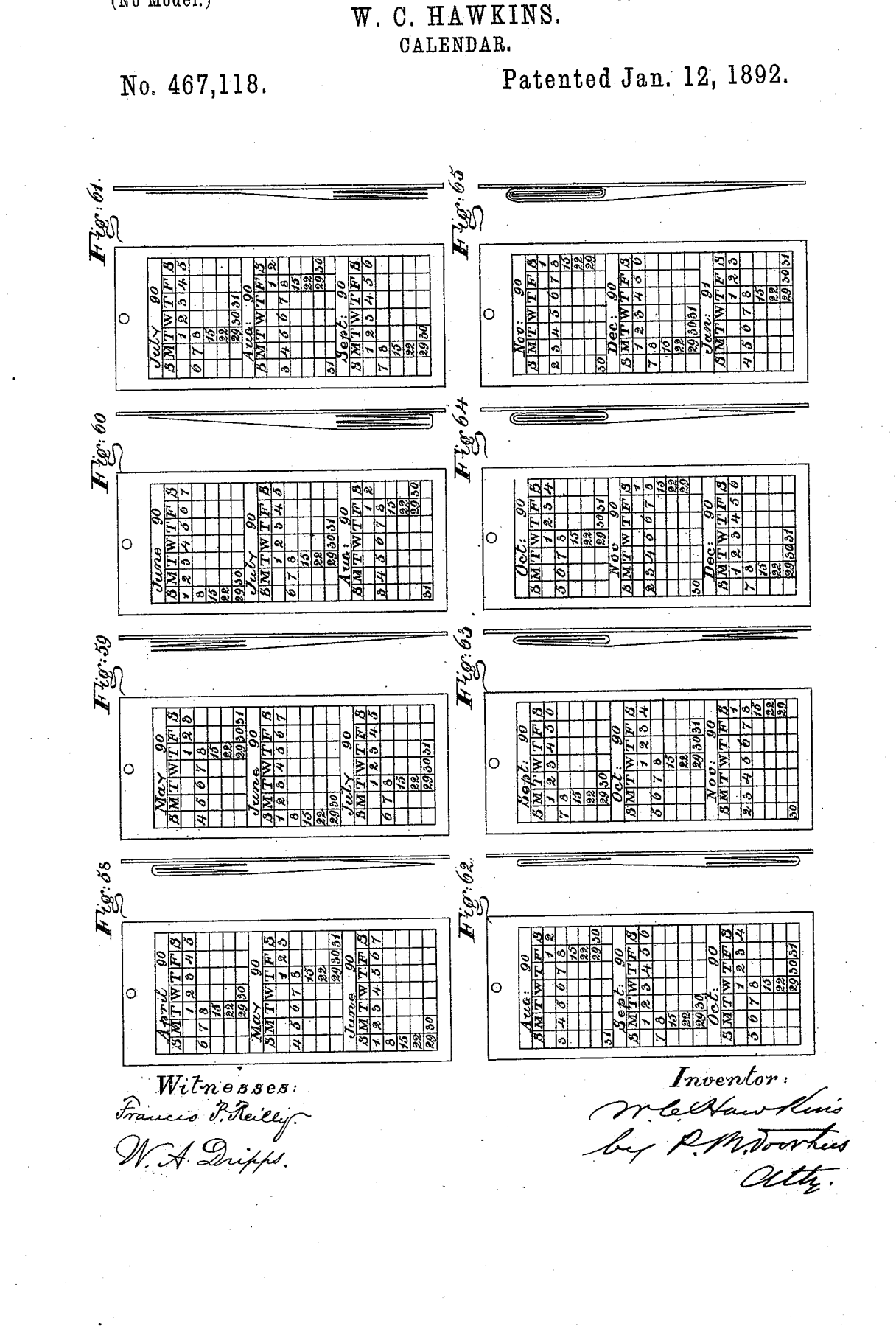

(No Model.) 17 Sheets—Sheet 8.

W. C. HAWKINS.
CALENDAR.

No. 467,118. Patented Jan. 12, 1892.

Witnesses:
Francis P. Reilly
W. A. Dripps.

Inventor:
W. C. Hawkins
by P. M. Voorhees
Atty.

(No Model.)  
17 Sheets—Sheet 9.
W. C. HAWKINS.
CALENDAR.
No. 467,118.  Patented Jan. 12, 1892.
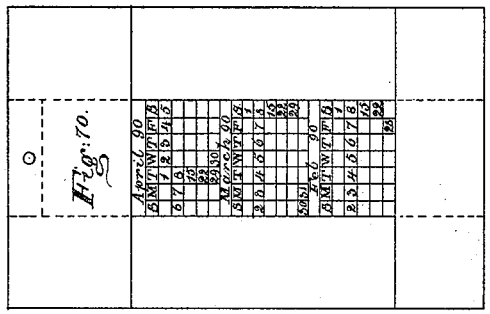
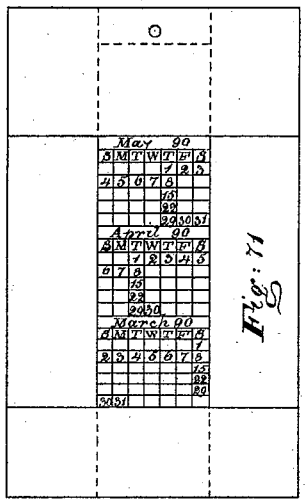
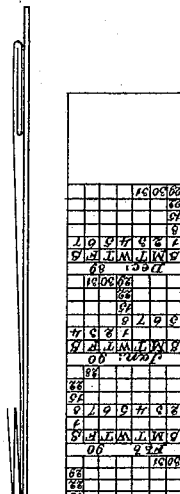
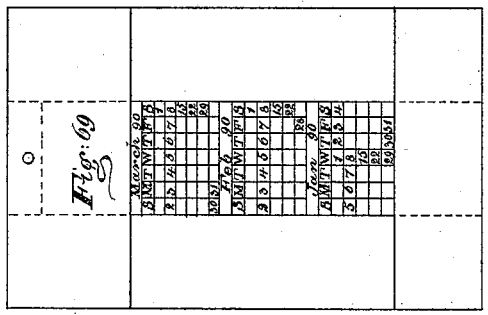
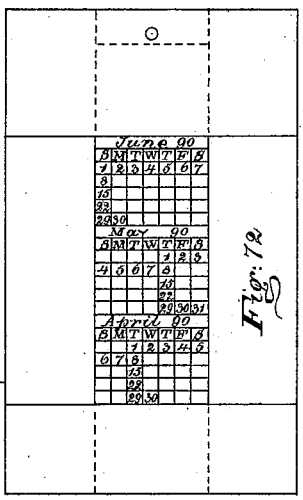
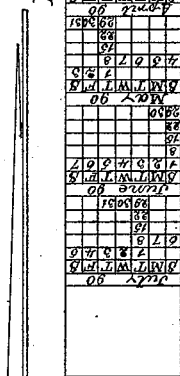
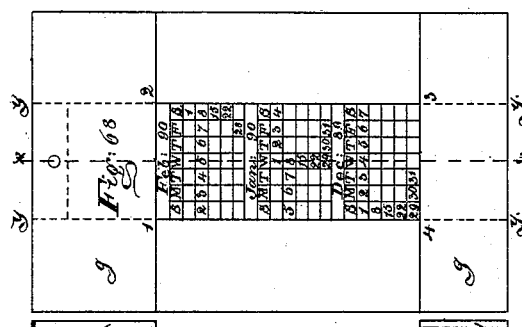
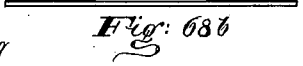
Witnesses:  
Francis P. Reilly  
W. A. Dripps
Inventor:  
W. C. Hawkins  
by R. M. Voorhees  
Atty.

(No Model.)  17 Sheets—Sheet 10.
W. C. HAWKINS.
CALENDAR.
No. 467,118.  Patented Jan. 12, 1892.
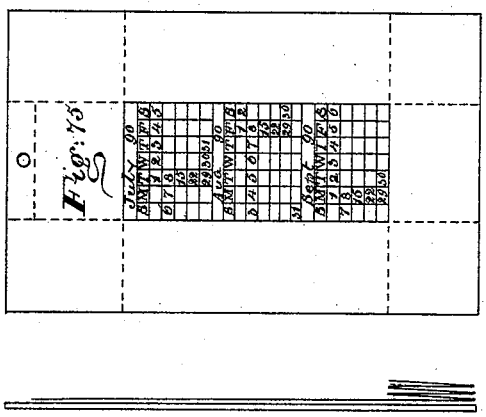
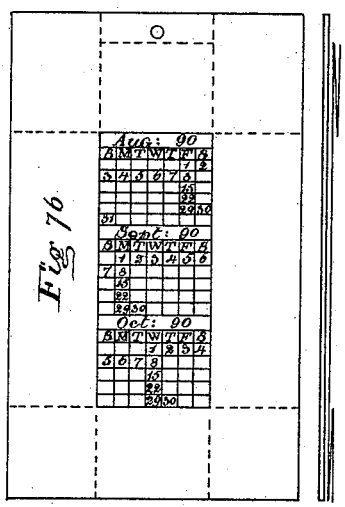
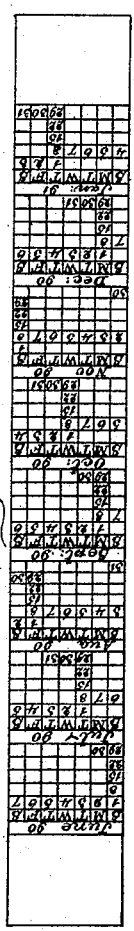
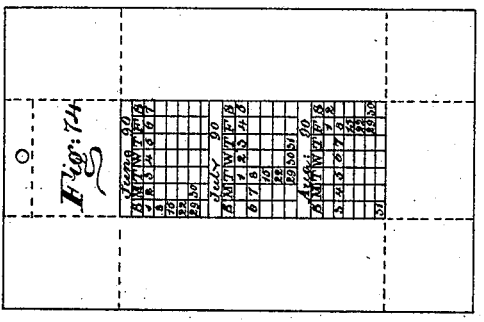
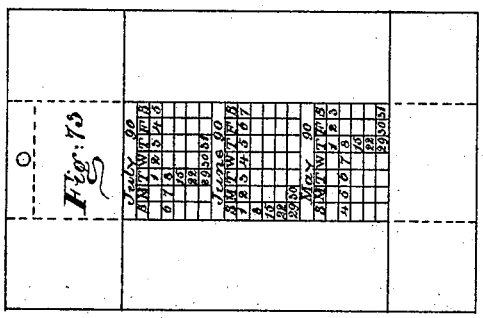
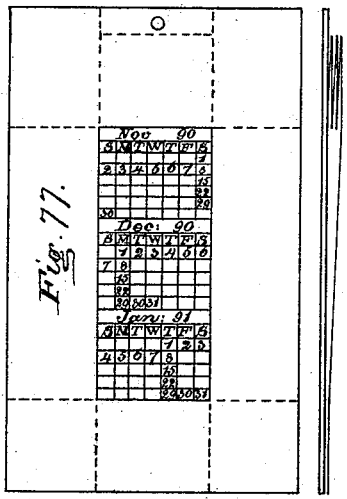
Witnesses:
Francis P. Reilly
W. A. Dripps
Inventor:
W. C. Hawkins
by R. M. Voorhees
Atty (No Model.)  
W. C. HAWKINS.
CALENDAR.
17 Sheets—Sheet 11.
No. 467,118. Patented Jan. 12, 1892.
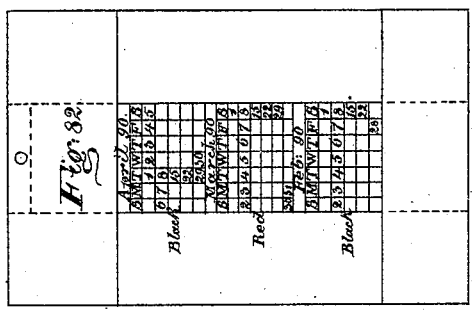
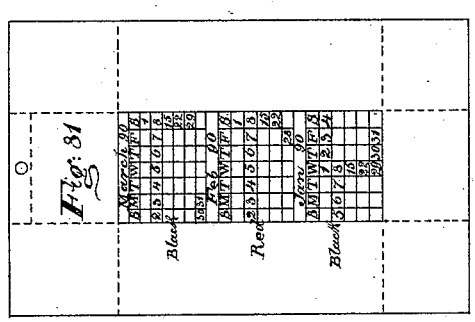
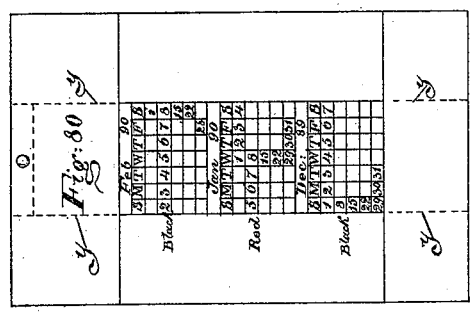
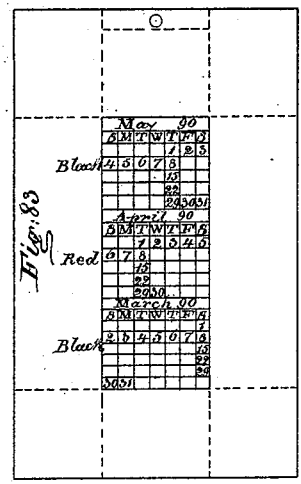
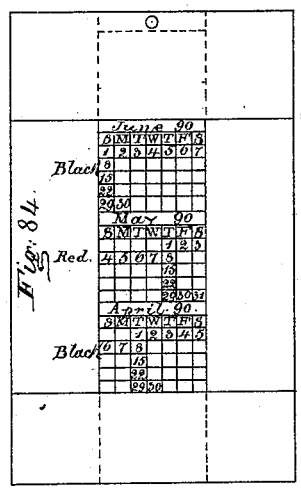
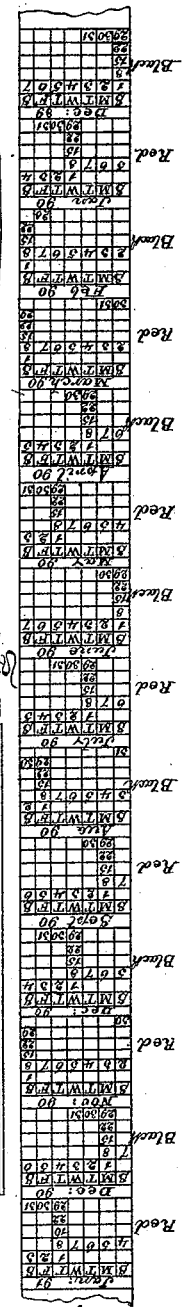
Witnesses:
Francis P. Reilly
W. A. Dripps
Inventor:
W. C. Hawkins
by P. M. Voorhees
Atty.

(No Model.) 17 Sheets—Sheet 12.
W. C. HAWKINS.
CALENDAR.
No. 467,118. Patented Jan. 12, 1892.
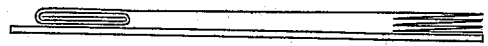
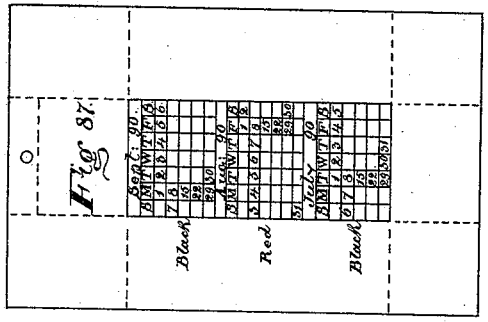
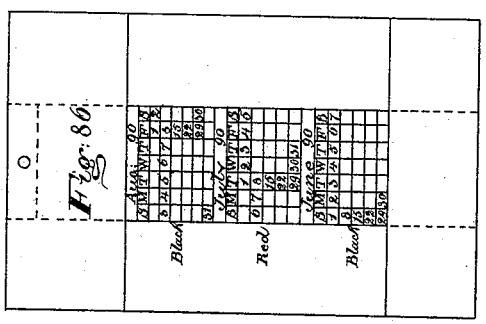
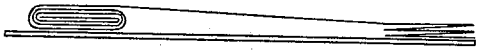
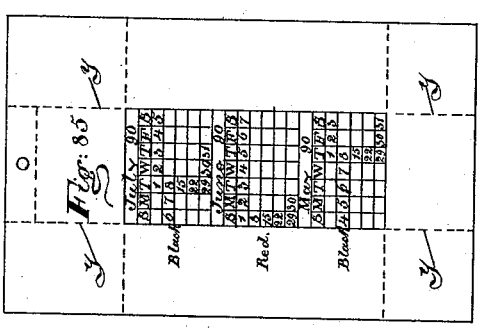
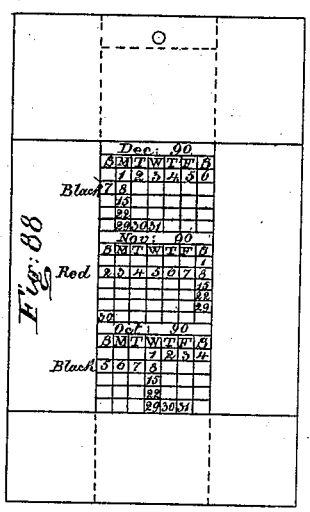
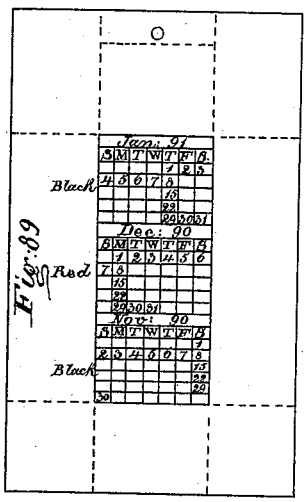
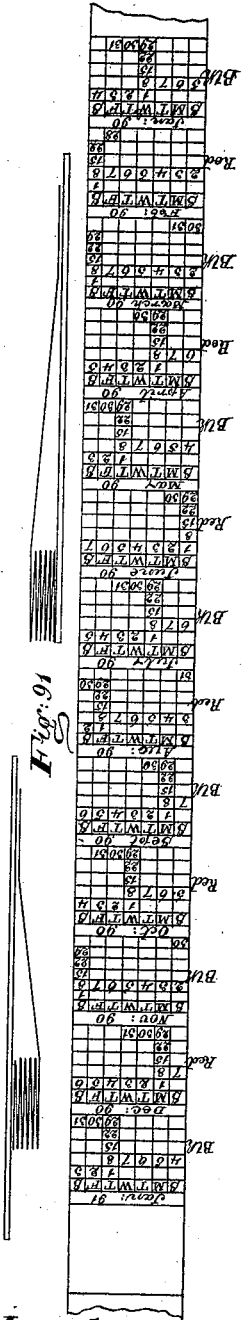
Witnesses:
Francis P. Reilly.
W. A. Dripps.
Inventor:
W. C. Hawkins
by P. R. Voorhees
Atty.

(No Model.) 17 Sheets—Sheet 13.
W. C. HAWKINS.
CALENDAR.
No. 467,118. Patented Jan. 12, 1892.
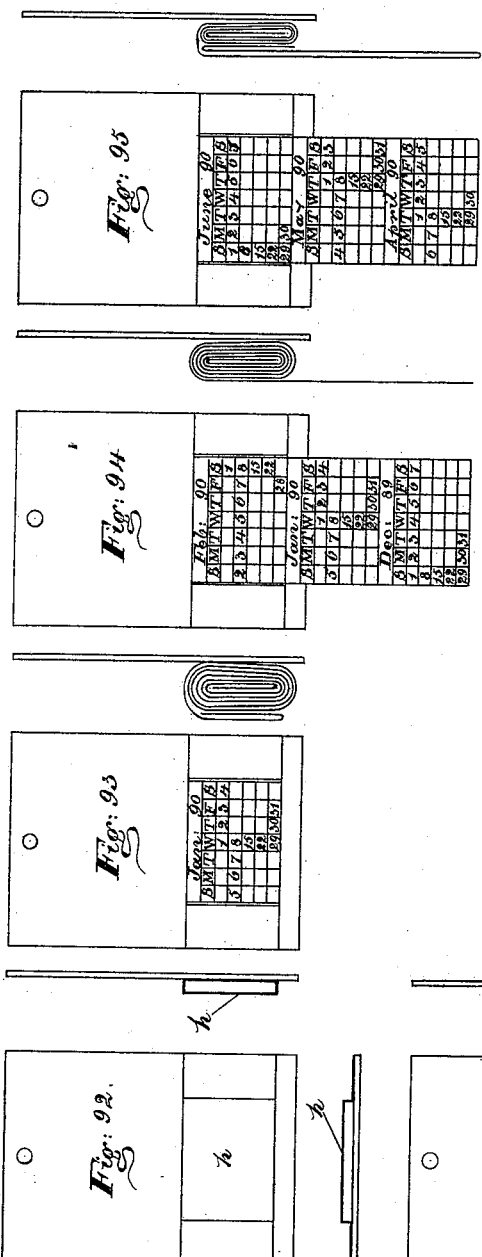
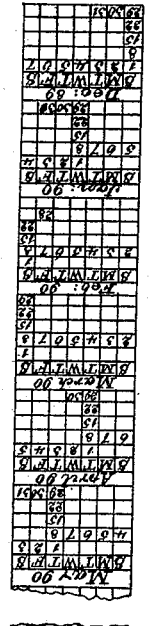
Witnesses:
Francis P. Reilly
W. A. Dripps.
Inventor:
W. C. Hawkins
by P. N. Voorhees
Atty.

(No Model.)  
17 Sheets—Sheet 14.
W. C. HAWKINS.
CALENDAR.
No. 467,118. Patented Jan. 12, 1892.
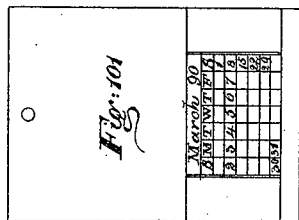
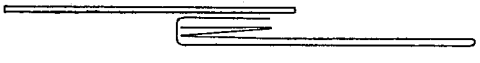
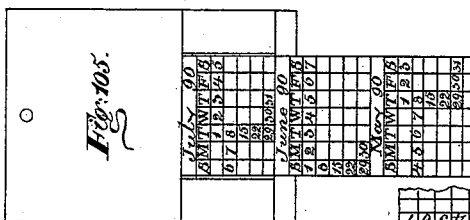
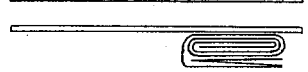
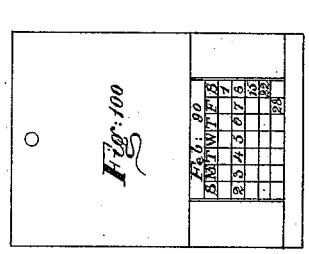
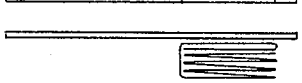
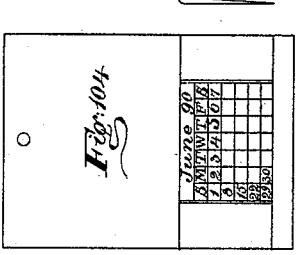
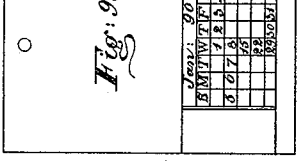
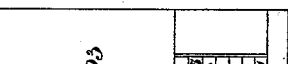
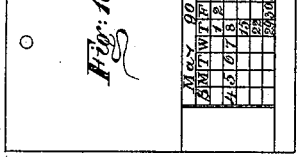
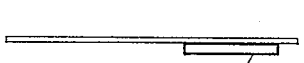
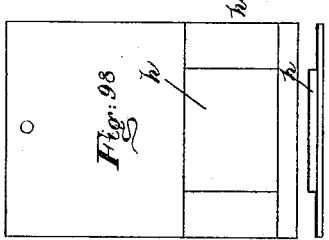
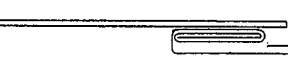
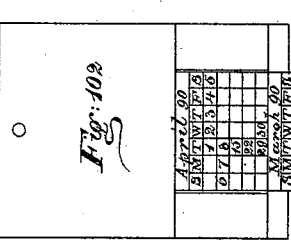
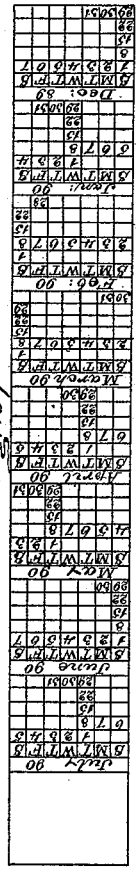
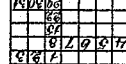
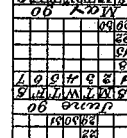
Witnesses:  
Francis P. Reilly  
W. A. Dripps
Inventor:  
W. C. Hawkins  
by P. M. Voorhees  
Atty.

(No Model.) 17 Sheets—Sheet 15.
W. C. HAWKINS.
CALENDAR.
No. 467,118. Patented Jan. 12, 1892.
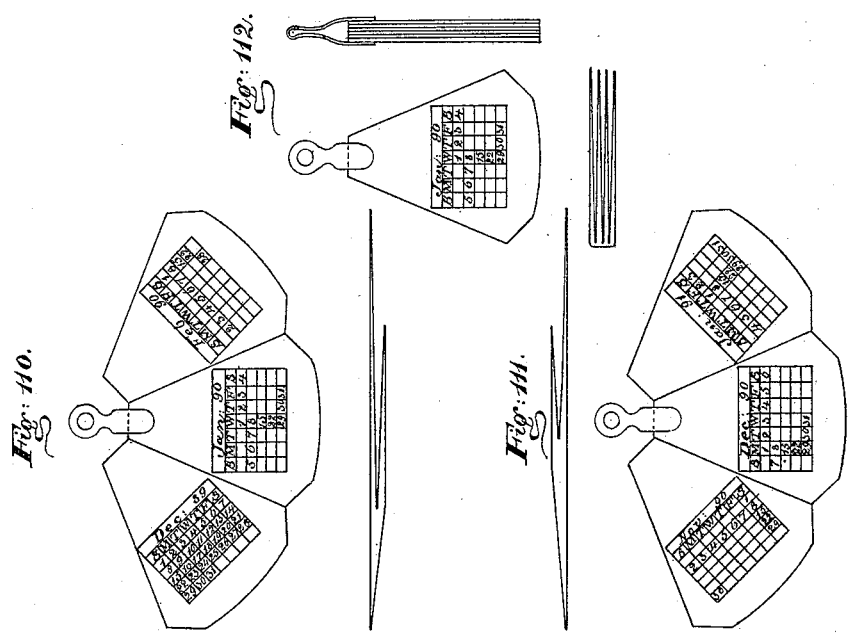
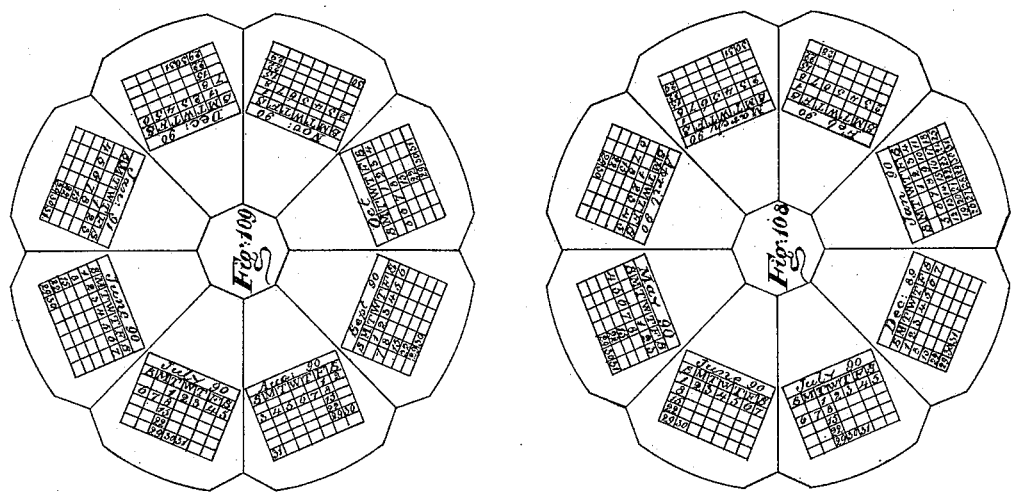
Witnesses:
Francis P. Reilly
W. A. Dripps.
Inventor:
W. C. Hawkins
by P. M. Voorhees
Atty.

(No Model.)     W. C. HAWKINS.     17 Sheets—Sheet 16.
CALENDAR.
No. 467,118.     Patented Jan. 12, 1892.
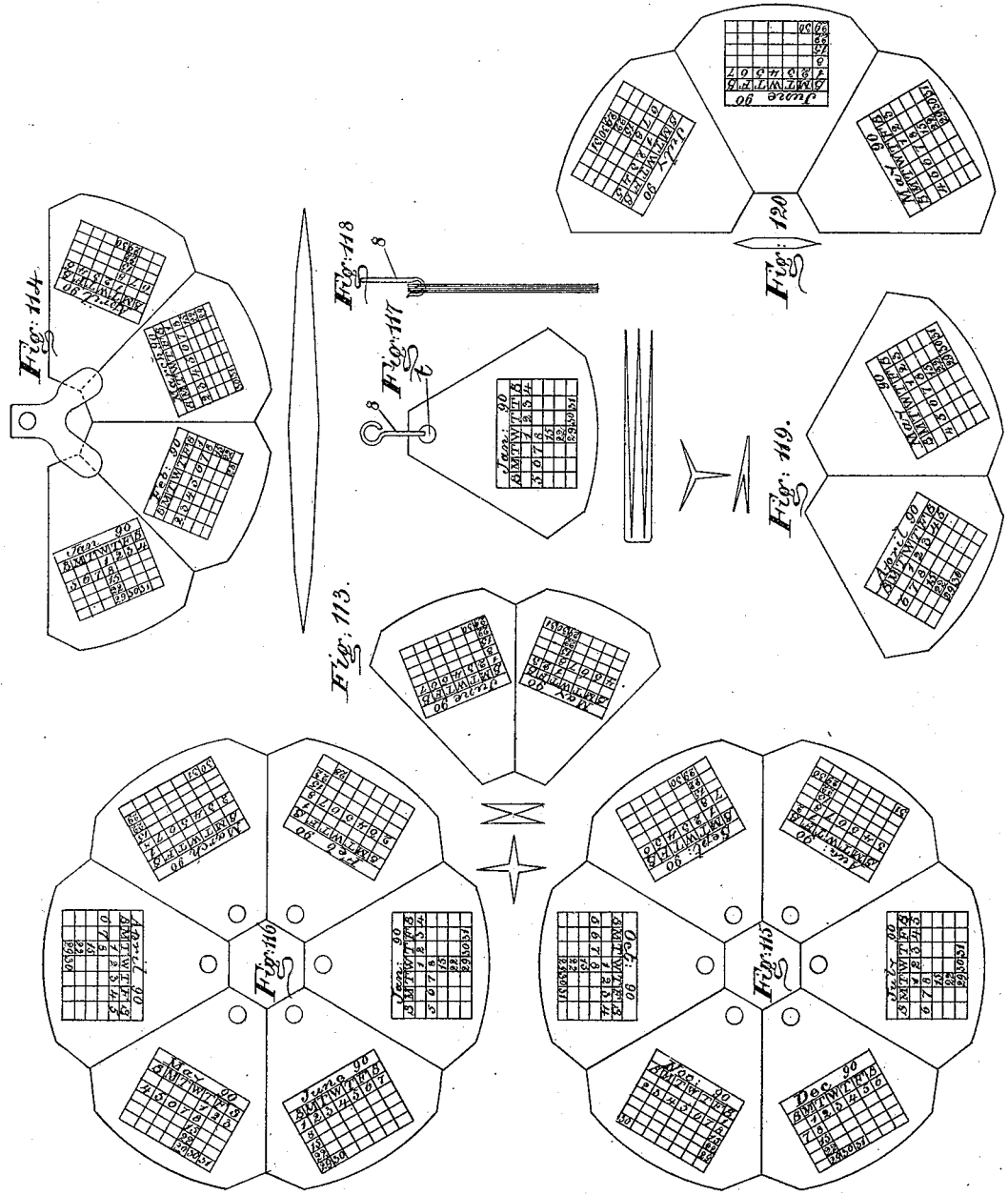
Witnesses
Francis P. Reilly
W. A. Dripps
Inventor
W. C. Hawkins
by P. Moorhus
Atty.

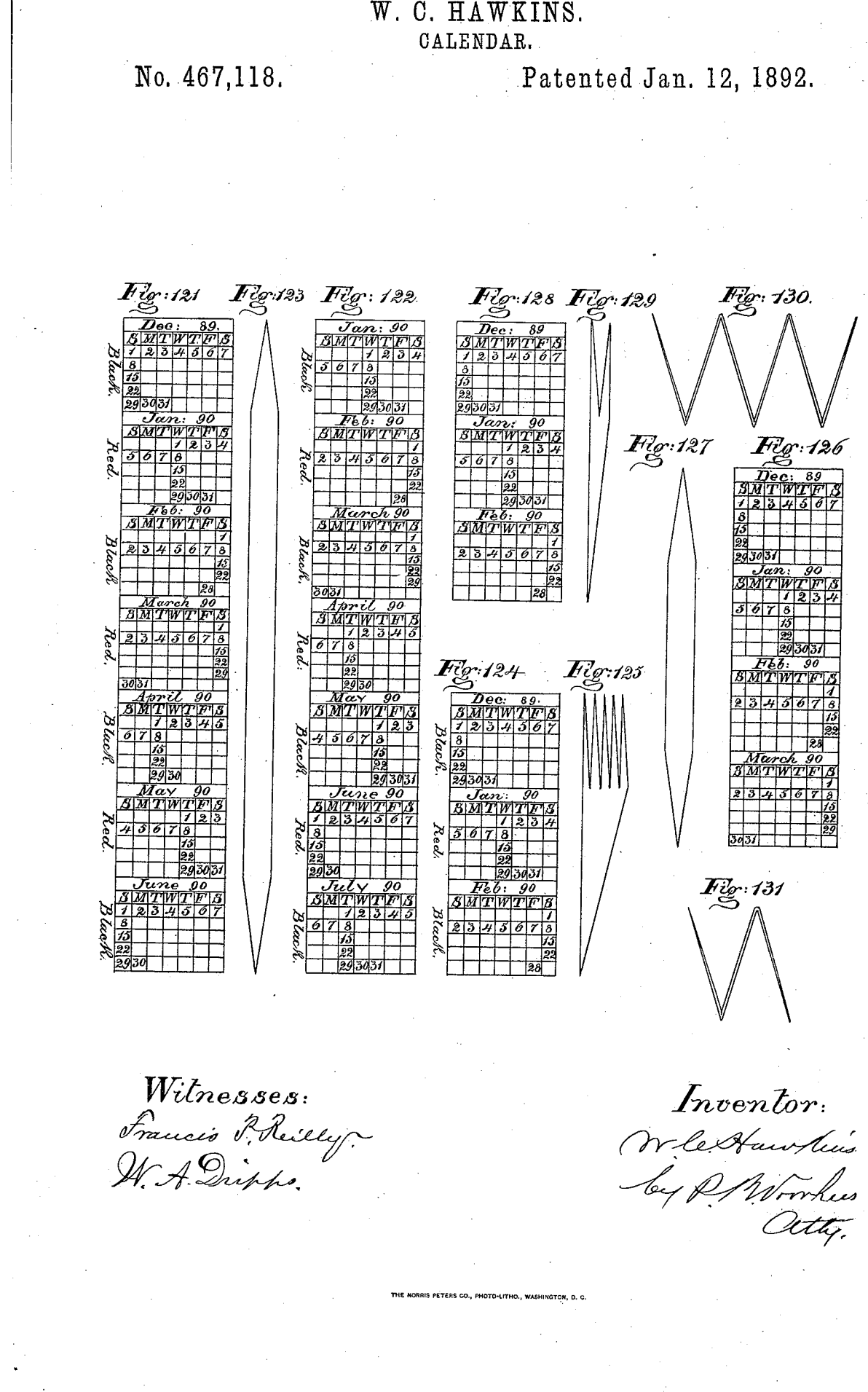

(No Model.) 17 Sheets—Sheet 17.

W. C. HAWKINS.
CALENDAR.

No. 467,118. Patented Jan. 12, 1892.

Witnesses:
Francis P. Reilly
W. A. Dripps

Inventor:
W. C. Hawkins
by P. S. Voorhees
Atty.

UNITED STATES PATENT OFFICE.

WILLIAM C. HAWKINS, OF TAUNTON, MASSACHUSETTS, ASSIGNOR TO JOHN T. HAWKINS, OF SAME PLACE.

CALENDAR.

SPECIFICATION forming part of Letters Patent No. 467,118, dated January 12, 1892.

Application filed June 23, 1890. Renewed December 14, 1891. Serial No. 414,917. (No model.)

*To all whom it may concern:*

Be it known that I, WILLIAM C. HAWKINS, of Taunton, in the county of Bristol and State of Massachusetts, have invented a new and useful Calendar, which invention is fully set forth and illustrated in the following specification and accompanying drawings.

The object of this invention can be better understood by a somewhat detailed explanation, as follows:

In the use of calendars it is very desirable to have exposed to view with the page for the current month the pages both for the last past and the next coming month, as particularly at or near the commencement of any month it is desirable to refer back and at or near the expiration of any month to refer ahead. It is also desirable that the current month, in any arrangement which may exhibit three months at the same time, be distinguished plainly from the others, as by some marked difference in color, or form of lettering or numbers, or by other means. It is also desirable to retain all the past months for future reference. It is the object, therefore, of this invention to provide such a calendar by printing the matter on one or both sides of a strip of paper, either all in one color or in one or more colors or printed in some other plainly-distinguishing manner, so that the printed strip, when folded upon itself and refolded in several ways, may present at the same time three months of a calendar for inspection when desired or any greater or less number of months up to the whole, and so that such strip, if printed in more than one color or distinguishing characteristic, shall have its printing, folding, unfolding, and refolding show the current month in some uniform color or other distinctive difference from the last past or the next coming month, or the current month in a distinctive position with reference to the other months.

It is also the object of this invention to provide, in conjunction with this form of calendar, space for advertising purposes where desired.

The accompanying drawings, in order to fully illustrate the invention and the several methods of folding, consist of seventeen sheets, containing in the aggregate one hundred and thirty-one figures.

Figure 1:
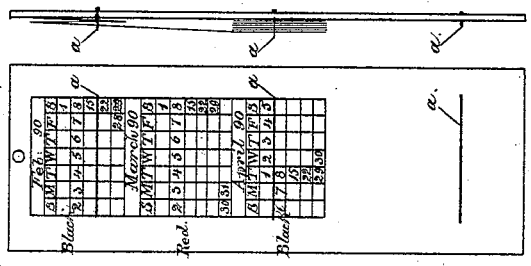

In said drawings, Figures 1 to 8, inclusive, show each a face and side view, for eight months, of a method of folding in alternation upon itself a strip of paper printed upon both sides, which two sides are shown in Figs. 9 and 10 with a distinction made between the months in colors. In this series Fig. 1 shows two views of a calendar consisting of a card, upon which any advertising matter may be printed upon any of the parts of the card not covered by the entirely folded-up calendar-strip, and exposing only the one month marked "December, 1889," the blank end *x*, Figs. 9 and 10, of the strip being pasted or otherwise secured to the card. In this series, for the first month—for instance, to commence for 1890—the strip is unfolded twice and placed in the position shown in Fig. 2, exhibiting to view the last month of 1889 in black, the supposed current month of January, 1890, in red, and the next succeeding month of February in black. In this position the advertising matter at the bottom and sides of the card is exposed. For the next month of February the strip is placed in position (shown in Fig. 3) with the first fold refolded under, showing the current month February in red and the past and coming months in black and the advertising on the top and sides exposed. For the next month, March, the strip is again placed in the position shown in Fig. 4, with two months refolded under at the top, with the current month in red and the past and coming months in black, and so on through Figs. 5, 6, and 7, in each case showing the current month in red and the past and coming months in black, the arrangement for current months of July, August, September, October, and November being omitted, as being obvious, the last, Fig. 8, showing the arrangement for the last month of the current year with December in red and November of the current year and January of the coming year in black, in which way every current month will be exhibited in red characters and the past and coming months in black.

Figs. 9 and 10 show the two sides of the strip as printed to conform to the plan of exhibition of the faces explained above. It may be understood at this point that I do not confine myself to designating the current from the other months by a difference in color, but that it may be done by printing the numbers and letters in different form or character or by making a distinctive difference in many other ways.

In Figs. 2, 3, 5, 6, 7, and 8 and all the remaining figures to be considered the folded strips are exhibited in side views in such open manner as to illustrate the direction of lay of the folds the more clearly, it being understood that in practice they will lie close and flat to the card, occupying only such thicknesses above the surface of the card as will be due to the several thicknesses of the paper required, as shown in Figs. 1, 4, and 23, which latter is a side view of Fig. 11 as it would be in practice.

Figs. 11 to 22, inclusive, are each a face and side view of a modification in the folding, unfolding, and refolding, so as to expose to view three months, with the current month a distinguishing color and occupying about two-fifths less length of card than in the arrangement in Figs. 1 to 8. In this series the calendar is not designed for advertising matter other than such as may be printed on the calendar-pages themselves, the printed slip exposing the three months practically covering the card, except such small margin as might be left for ornamentation, and Figs. 24 and 25 show the arrangement of colors and printing of the strips for the same. Fig. 11 shows the calendar as arranged for January, 1890, with that month in red, and December, 1889, and February, 1890, in black, Fig. 12, with February, 1890, in red, January and March in black, and so on. In this modification the printed strips may be pasted or otherwise secured to the card at the end, if desired, by leaving an extra blank page at each end, or they may be kept wholly unattached to the card, if desired, for the purpose of readily consulting every month printed on the calendar. In this case and those following, in which the printed strips will not be pasted or otherwise attached to the cards, various methods of holding the same will hereinafter be described.

Figs. 26 to 39 each show a face and side view of a modification of folding or rolling, in which the distinguishing color or other characteristic of the current month is dispensed with and three months at a time exposed to view, but with the current month always in the center, the current month being distinguished by that means, and requiring strips long enough only to contain eight months printed on each side, but serving at the beginning of the year to show the last month of the preceding year and the second month of the current year in conjunction with the first month of the current year, the current month of the current year being in the center as exposed for every month of the year, and so on to the last month of the current year, as shown in Fig. 38, in which the past month of the current year and the first month of the coming year are on each side of the current month of the current year.

Figs. 39 and 40 show the plan of printing on the two sides of the strip of paper for the modification shown in the series of Figs. 26 to 38.

Figs. 41 to 52 show similar views of a modification in which the distinguishing color or other characteristic for the current month is dispensed with, the strip printed on only one side, three months always exposed to view, with the current month in the center as a means of distinguishing it readily, the last month of the preceding year exhibited with the first and second months of the current year, and the first month of the coming year with the last two months of the current year. In this method of folding the strip is first continuously folded or rolled upon itself instead of in alternation and refolded in alternation, as shown.

Fig. 53 shows the order of the fourteen months as required to be printed on one side only of the strip.

Figs. 54 to 65, inclusive, show a modification in which a strip printed with eight months only on each side is folded or rolled continuously upon itself, refolded in alternation, and reversing the sides at each change of months, exposing to view three months at a time, with the current month always in the center as a distinguishing position, showing, with the first and second months of the current year, the last month of the past year, and, with the last two months of the current year, the first month of the coming year.

Figs. 66 and 67 show a plan of printing on the two sides of the strips for this modification.

Figs. 68 to 77, inclusive, show a modification by which, with one of the methods of folding and rolling partly continuously and partly in alternation upon itself, a strip is printed on both sides, with pages for eight months only on each side, by which arrrangement may be exhibited three months at a time, with the current month in the center as a distinguishing mark, through an opening in the card on one side and directly on the face of the card on the other side, the changes from month to month being made by unfolding the strip as at first continuously folded or rolled upon itself at the top, as shown in Fig. 68, and refolding in alternation at the bottom until six months have been exposed, after which for the last six months it is refolded back again upon itself continuously in the reverse order, and then unfolded and refolded in changing in the same manner as for the first six months. The object of cutting the opening in the card is to permit of both sides of the card being utilized for advertisements or for placing pockets, such as are described below, on both sides of the cards by exhibiting the calendar-pages at one time from one side and at another time from the other side, the printed slip being placed in the pockets with the proper face to show the months required. In this modification the pockets above referred to are formed for the reception of the top and bottom folds, as shown at $g$, Figs. 68, 68$^a$, and 68$^b$, made by pasting a band of paper across the top and bottom of the card, crimped on the lines $y\ y$, Fig. 68, so as to furnish room for the entrance of the folds between the pocket-strip $g$ and the card. This pocket-strip can of course be printed on for advertising purposes in common with the sides and margins of the card. Fig. 68$^a$ is a side view in section on $x\ x$, Fig. 68, showing these pockets, and Fig. 68$^b$ a similar end or bottom view. In this modification three months are exposed at a time, including for the first month of the current year the last month of the past year, as in Fig. 68, and for the last month of the current year the first month of the coming year, as in Fig. 77, with the current month always in the center as a distinction. With this modification, also, both sides of the card, as well as the top and bottom and side margins in each case, may be utilized for advertising, if desired, and the folded parts of the strips be hidden from view by the pocket $g$. The rectangle 1 2 3 4, Fig. 68, is an opening cut in the card, and similarly with Figs. 69 to 77, inclusive In the process of manufacture the pieces cut out of the rectangle for large cards may be utilized in the manufacture of smaller cards. A figure for the current months for October and November in this arrangement is omitted, as obvious from those given.

Figs. 78 and 79 show the arrangement of printing the two sides of the strip for Figs. 68 to 77, inclusive.

Figs. 80 to 89, inclusive, in which the arrangement for September and October is omitted, as obvious from those shown, shows an arrangement similar to that in Figs. 68 to 79, providing, however, for the exposition of the current month in a distinguishing color or other marked difference, as may be desired. In this modification the strip is printed on both sides and first folded or rolled continuously upon itself and placed, as in Fig. 80, for the first month reversed, with the card for the second month without other change, as shown at Fig. 81. Then, for the third month, the strip is unfolded two folds and refolded twice at the bottom, as shown in Fig. 82, then the card reversed, as shown in Fig. 83, for the fourth month, and so on until for the last month the strip will have been refolded upon itself in alternation at the bottom of the card, and every month have been shown in the distinguishing color or device in the center, with the past and coming months in other color or device on either side of it, the first current month accompanied with the last month of the past year and the coming month of the current year, and the last month of the current year with the first month of the coming year and the preceding month of the current year, and both sides of the card utilized for advertising.

Figs. 90 and 91 show the order of printing the strip for Figs. 80 to 89. In either of the modifications, including Figs. 68 to 87 and Figs. 80 to 89, the opening in the card may be so proportioned as to show only one month, if desired, and thus serve as the ordinary tear-off calendar, but preserving the whole year for reference, and with the arrangement as in Figs. 80 to 89, the strips being printed on one side only, if not desired to retain the past months for reference, as many of the past months may be torn off on the line of the folds, as may be desired.

Figs. 92 to 96 show a modification in which a pocket $h$, Fig. 92, is attached to the card. A strip with calendar-pages for fourteen months is printed upon one side, including the last month of the past year and the first month of the year next ensuing, folded or rolled continuously on itself, and placed in the pocket $h$ so as to exhibit as many months hanging down as may be desired. Its pages may be torn off when they have become old enough to be considered as no longer required. Fig. 97 shows the printing of the strip for this modification.

Figs. 98 to 105 show an arrangement similar to Figs. 92 to 96, with the strip printed in eight calendar-pages on each side, including on one side the last month of the year last past and on the other the first month of the year next ensuing. In this modification any number of months may be exposed up to six at a time, and three months, with the current month in the center always exposed, if desired, by the method of refolding and placing the refolded end in the pocket $h$, or the strip may be similarly refolded and placed to show but one month at a time, as in Figs. 99 to 105.

In several of the views I have shown different means of holding the folded strips in place on the card. In Figs. 1, 2, 3, 4, and 11 elastic bands or cords $a$ are passed through holes in the card and knotted in the back. Fig. 11 shows a cord $b$ extending lengthwise of the card, and Fig. 23 is a side view of the same. Fig. 12 shows two of these card-cords, for which the side view, Fig. 23, also answers. Figs. 26 and 27 show similar cords $b$. Figs. 30 and 31 show diagonal slits $d$ with partial continuation of these slits on rectangular lines, these slits cut into the card forming a flap opening through which the corners of the folded strips may be tucked. Fig. 38 shows metallic clasps $e$ attached to the card. Figs. 32 and 33 show horizontal slits $f$ cut in the top and bottom of the card, these slits extending a short distance into the vertical lines to enable a flap to be bent back for the reception of the top and bottom of the folded strips, and many other similar means may be devised for holding the folded calendar-strips upon the card. I do not confine myself to any of these means of holding in place the strips, as the same may be varied greatly and form no part of this invention.

It is understood that in any of the modifications heretofore described the calendar-strips may be printed so that the folding may be made horizontally instead of vertically, making an exhibition-card that would occupy a greater space in a horizontal direction than in a vertical direction, the pages being printed so that the numbers, letters, &c., shall run at right angles to those shown, all without departing from the gist of this invention, which practically consists in exhibiting with the current month one or more of the months last past or one or more of the months next ensuing, or both one or more of the months last past and one or more of the months next ensuing, the proper number of calendar-tables of months of the year last past and of the year next ensuing being printed on the calendar-strip in addition to the twelve months of the current year, and the months which are not desired to be shown being obscured from view.

Figs. 108 to 131, inclusive, illustrate modifications in which the printed slip is an endless one. In Figs. 108 to 120, inclusive, the endless strip is cut in polygonal or circular form from a flat sheet, and in Figs. 120 to 131 the strip is made endless by pasting together the free ends.

Figs. 108 to 111 and 113 and 114 illustrate the modification in which the printed slip is in the shape of an annular polygon, having eight calendar-pages printed on both sides, Figs. 108 and 109 showing the order of printing. In this modification the annular strip is folded upon itself, as shown in Figs. 110 and 111, so as to show three months at one time, with the current month in the center as a distinguishing mark, including the last month of the past year with the first two months of the current year, as in Fig. 110, and the first month of the coming year with the last two months of the current year, as in Fig. 111. In this modification the calendar-pages may be printed in rectangular spaces, as shown, leaving the remainder of the triangular-shaped page free for advertisements. This may be folded, as shown in Fig. 112, and used to expose one month only, if so desired, or it may be folded, as in Fig. 114, showing four months at a time, or to show two pages at a time, as in Fig. 113.

As a cheaper form of the last-described modification the annular strip may be printed on only six faces on each side, and, as shown in Figs. 115 and 116, folded for use as a calendar exposing but one month at a time, as shown in Figs. 117 and 118, or to expose two months at a time, as in Fig. 119, or to show three months at once, as in Fig. 120.

In the modification in Figs. 108 to 115 the calendar may be suspended, in any of the forms of folds, by clip or clasp, as shown in Figs. 110, 111, 112, and 114, or by a hook, as 8, passing through a hole $t$, Fig. 118, punched through all the thicknesses of the calendar when folded, as shown, or by any other suitable means of suspension; or it may be held against a card-board back, as has been shown for the previously-described straight strips.

Figs. 110 and 111 show the endless annular strip printed with eight pages on each side, folded for the first and last months of the year, with these months in the center, respectively, and in the first case accompanied with the last month of the past year and the second month of the current year, and in the last case with the month last past of the current year and the first month of the coming year. It is evident that in the figures showing the annular strips the cutting out of the central portion may be dispensed with, if desired, making the flat printed sheet a polygon or circle, instead of an annular strip, without departing from the gist of this invention.

Figs. 121, 122, 123, 124, and 125 show an endless strip made by pasting together the two ends of a strip, such as Fig. 9, printed on both sides in fourteen calendar-pages in alternate colors or distinguishing characteristics. Fig. 121 shows the plan of printing on half of one side, and Fig. 122 a plan of printing on one-half of the other side of the strip, Fig. 123 being an edge view of the same drawn open to show the complete strip the more clearly. Fig. 124 shows a face view, and Fig. 125 an edge view, illustrating the plan of folds as arranged to exhibit three months, with a red or other characterized month in the center. Fig. 124 shows the last month of 1889 and the first two months of 1890, with January of 1890 in the middle in red, the months of either side being black. To change the folds for the next month, in order to have February, 1890, in the middle in red, the strip is turned inside out and folded again, as shown in Fig. 125, exhibiting the months January, February, and March of Fig. 122, bringing February in the center in red, reversing sides and proceeding similarly for each month. The endless strip may be made dispensing with the distinguishing color or characteristic in the center by printing on one side only and folding, as shown in Fig. 125, and thus exhibit three months for each month of the year with the current month in the center as a distinguishing position.

Figs. 126, 127, 128, and 129 show a similar endless strip, in which the distinguishing characteristic for the middle month is dispensed with, but exhibiting three months at a time when desired, with the current month in the center as a distinguishing position. In Figs. 126 to 129 the strip requires to be only long enough to take eight months on each side and does not require to be turned inside out until the first six months of the year have elapsed. Fig. 128 is a face view, and Fig. 129 an edge view, showing folds and position of parts for the first month of the year, showing January of the current year in the center. The endless strip, Figs. 121 to 125, may be folded to show but one month at a time, if desired, as illustrated in edge view, Fig. 130, requiring to be printed on one side only in the twelve months of the year, or on both sides in six months each, if reversed and folded, as shown in Fig. 131, for six months of the year. Figs. 121 to 131 may be suspended by clips of any approved make or attached to an advertising or ornamental card in any of the ways heretofore described.

I do not broadly claim a folding calendar, nor do I claim, broadly, a folding calendar in combination with a suspension advertising card; but As of my invention I claim—

1. In a calendar, a strip of paper or other suitable material having printed thereon tables of one or more of the last months of the past year and one or more of the first months of the coming year, one set or both, in addition to tables of the twelve months of the current year, substantially and for the purposes set forth.

2. In a calendar, a strip of paper or other suitable material having printed thereon tables of the twelve months of the current year, of the last month of the past year, and of the first month of the coming year, substantially as and for the purposes set forth.

3. A calendar consisting of a strip of paper or other suitable material having printed on one or both sides calendar-tables of months in proper order and number, disposed so that by bending, folding, or rolling the strip upon itself there are exposed to view simultaneously for every month of the current year the calendar-tables of one or more of the months last past and one or more of the months next ensuing, one set or both, in addition to the table for the current month, the whole preservable for reference, substantially as and for the purposes set forth.

4. A calendar consisting of a strip of paper or other suitable material having printed on one or both sides calendar-tables of months in proper order and number, disposed so that by bending, folding, or rolling the strip upon itself there is exposed to view simultaneously for each month of the current year a table for the current month in the center, and a table or tables for the months last past, and a table or tables for the months next ensuing on either side of the same, whereby the current month will have a distinguishing position, the whole preservable for reference, substantially as and for the purposes set forth.

5. A calendar consisting of a strip of paper or other suitable material having printed on one or both sides in alternating colors or other distinguishing characteristics calendar-tables of months in proper order and number, disposed so that by bending, folding, or rolling the strip upon itself there is exposed to view simultaneously for each month of the current year a table for the current month, having one of the distinguishing characteristics located between tables having a distinguishing or distinctive characteristic, one of the latter indicating the month last past and the other the month next ensuing, the whole preservable for reference, substantially as and for the purposes set forth.

6. In a calendar, an endless or annular strip of paper or other suitable material having printed on one or both sides calendar-tables of months in the proper order and number, disposed so that by bending, folding, or rolling the strip upon itself there are exposed to view one or more tables exhibiting the current month and such other months in connection therewith as may be desired, the whole preservable for reference, substantially as and for the purposes set forth.

7. A calendar consisting of a strip of paper or other suitable material having printed on each side eight or more monthly calendar-tables, one side containing the first seven or more months of the current year and one or more of the months of the year last past, and the other side containing the last seven or more months of the current year and one or more of the first months of the year next ensuing, disposed so that by bending, folding, or rolling the strip upon itself there is exposed to view for every month of the current year simultaneously a table for the current month, a table or tables for the months last past, and a table or tables for the months next ensuing, the whole preservable for reference, substantially as and for the purposes set forth.

8. In a calendar, in combination with an advertising or other suspension-card therefor, a strip of paper or other suitable material having printed on one or both sides monthly calendar-tables in the proper order and number, disposed so that by bending, folding, or rolling the strip upon itself there is exposed to view simultaneously for each month of the current year a table for the current month, a table or tables for one or more months last past, and a table or tables for one or more of the months next ensuing, the whole preservable for reference, substantially as and for the purposes set forth.

WM. C. HAWKINS.

Witnesses:
 CHAS. L. HANDFORD,
 JOHN T. HAWKINS.